April 24, 1951 E. D. GEIGER ET AL 2,550,240
WEIGHING AND DISPENSING BIN
Filed Sept. 28, 1945 2 Sheets-Sheet 1
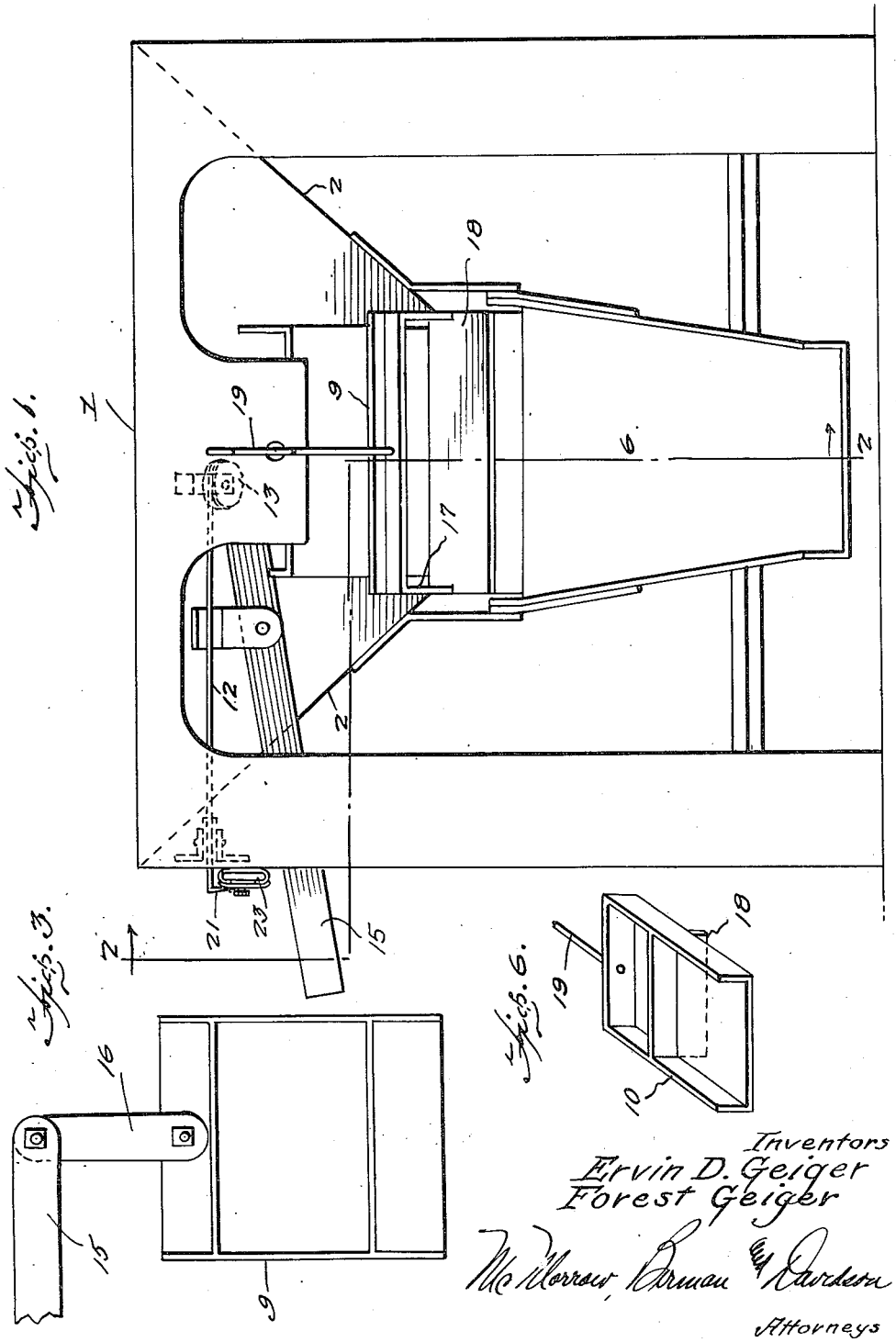
Inventors
Ervin D. Geiger
Forest Geiger
Attorneys April 24, 1951 E. D. GEIGER ET AL 2,550,240
WEIGHING AND DISPENSING BIN
Filed Sept. 28, 1945 2 Sheets-Sheet 2
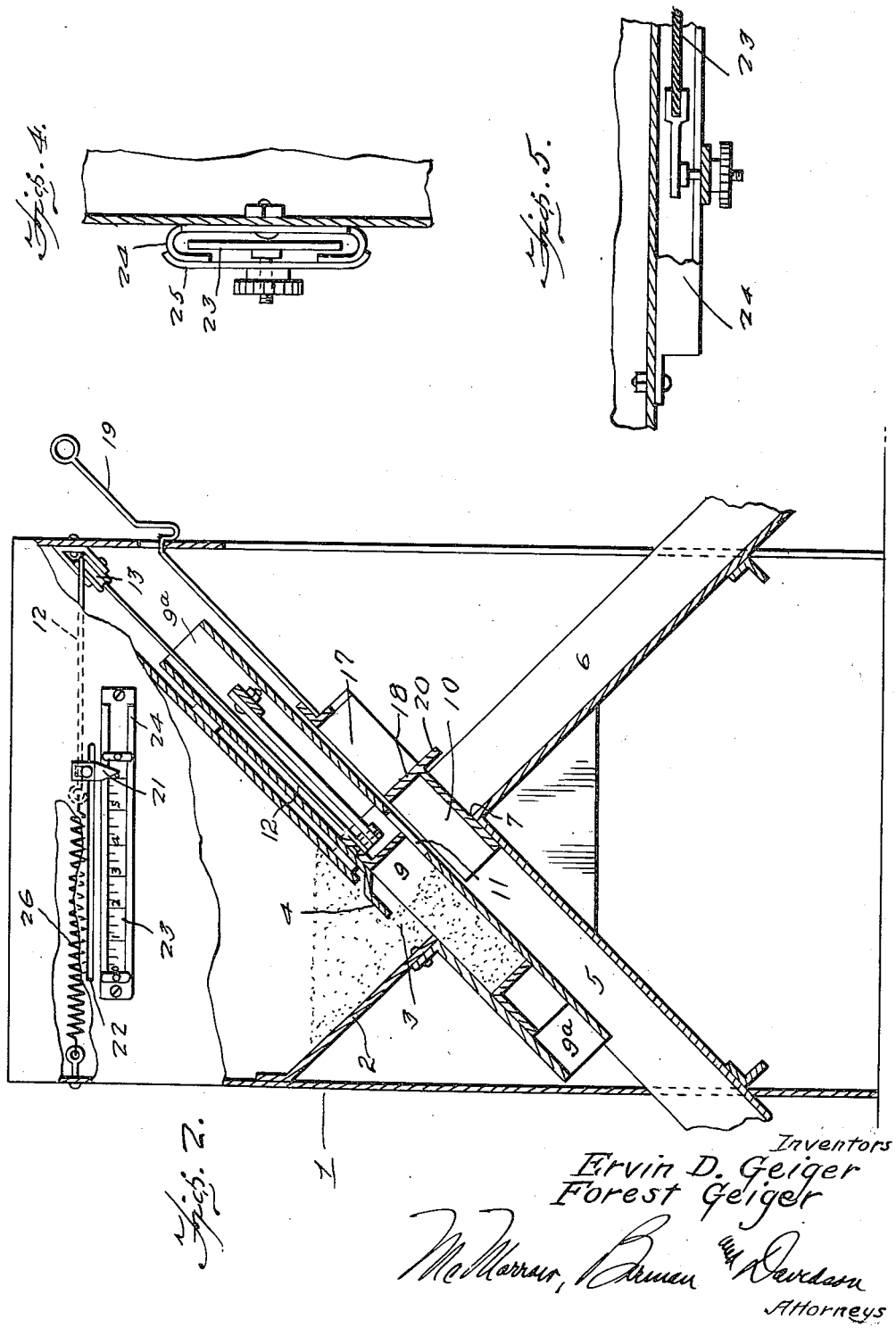

Patented Apr. 24, 1951

2,550,240

UNITED STATES PATENT OFFICE 2,550,240

WEIGHING AND DISPENSING BIN

Ervin D. Geiger, Kankakee, Ill., and
Forest Geiger, Churubusco, Ind.

Application September 28, 1945, Serial No. 619,220

4 Claims. (Cl. 222—361)

The present invention relates to dispensing bins and is more particularly concerned with dispensing bins adapted to automatically measure the quantity of commodities such as feed, grain and the like, passing through.

One of the objects of the invention is to provide a computing dispensing bin which quickly and accurately dispenses the desired amount of commodity, as pre-determined, by the simple movement of a hand operated lever.

Another object of the invention is to provide a computing dispensing bin of simpler and more compact construction than what is disclosed in prior devices.

With the foregoing and other objects and advontages in view, the invention consists of the novel construction and arrangement of parts hereinafter described and claimed.

In the accompanying drawings illustrating the invention,

Figure 1 is a rear end elevation of the computing dispenser.

Figure 2 is a side elevation showing a vertical longitudinal section on line 2—2 of Figure 1.

Figure 3 is a detail bottom plan view of one member of the dispensing unit.

Figure 4 is an end view of the scale.

Figure 5 is a top plan view of the scale partly in section.

Figure 6 is a detail perspective view of the second member of the dispensing unit.

Like numerals are employed in the description and drawings to designate the same parts of construction.

Bin 1 may be of any desirable shape and size with interior hopper 2 adapted to funnel the bulk commodity to discharge opening 3 in the floor. An arched guard or raised clearance projection 4 is fitted in the upper end of discharge opening 3 to prevent the box end of slidable member 9 from jamming with material as it passes beneath the upper edge of opening 3. This prevents damage to any commodity in the machine and thereby obviates clogging of the machine as the material is being discharged from member 9. Below the bin proper are divergently inclined open chutes 5 and 6 having a common opening 7 at the top.

Between the bin opening 3 and the chute 6 is the inclined dispensing unit, consisting of two slidable rectangular members 9 and 10. Member 9 slides in a passage-way 9a, on the underside of the bin, which is provided with an opening registering with discharge opening 3. An opening 11 in the bottom of the passage-way, communicates with chute 5. Attached to the upper end of measuring member 9, is a cable 12, located interiorly of the bin frame and passing around pulleys 13 to a scale indicator 21 on a side of the bin, to be described hereafter. Member 10 is positioned in the upper part of chute 5 and beneath the passageway 9a. Member 9 is operated by a pivoted lever 15 extending from a side of the bin, which is pivotally connected to the top or upper end of 9 by a pivotal link 16. The member 9, which is immediately beneath the discharge opening 3, is open at top and bottom.

Member 10 is open at the top and also partially at the bottom, adjacent its upper end, as at 17. This opening in the bottom is partitioned off as at 18. Secured to the upper end of member 10 is a draw rod 19 with a handle projecting rearwardly outside of the bin, whereby the element 10 can be operated to discharge into either chute. A transverse rib 20 on the underside of member 10 limits the downward movement thereof.

The hereinbefore mentioned indicator 21 is adapted to slide in an horizontal slot 22 formed in a side wall of the bin and overlies the face of an elastic tape 23, bearing a scale, preferably in pounds, which is adjustably mounted in an open frame 24 on the outside of the said side of the bin. Clamps 25, adjusted by thumb screws, are provided for each end of said tape. A resistance spring 26 is attached at one end to the cable 12 and at the other end to the bin casing. This spring is adapted to counter the weight of material as fed to the measure box 9 from the hopper of the bin.

By means of the clamps, which can be moved back and forth on the frame 24, the scale on the elastic tape can be lengthened but the scale markings will remain in proper relation at any stretched length. The indicator 21 is mounted adjustably on the end of cable 12, so that it can be set at any desired point on the scale.

Assuming that the slidable measuring box 9 holds a bushel of grain weighing 60 pounds, the machine is set to dispense a bushel of the grain by placing the measuring box 9 in its lowermost position in the slideway 9a, thereby moving the indicator or pointer 21 from 0 to the extreme opposite end of the scale 23. The elastic scale 23 is stretched so that the numeral 60 thereon registers with the pointer 21. The machine needs no further adjusting as long as the same grain is being handled. When it is desired to dispense only 30 pounds of the grain or one-half bushel thereof, the full bushel load is dispensed from the machine so as to move the pointer 21 back to its 0 position, the measuring box 9 being thereby moved to its uppermost position in the slideway 9a in which the opening 3 is closed. The lever 15 is then moved half way, thereby moving the said indicator from 0 to 30, and slidable member 9 down to its half way position. Said lever 15 is then moved back to original position thereby moving indicator 21 back to 0 again, and discharging 30 pounds or one half bushel through discharge opening 11, into chute 5, member 10 being in the elevated position shown in Figure 2. Thus, one up and down movement of the lever 15 can measure and discharge any amount of grain or the like up to the 60 pounds for which the machine is set.

The measuring and dispensing device of this invention is particularly used for sacking grain and the like where a plurality of quantities of the same size and weight are desired. The measuring device is manually operated by moving the measuring box 9 upwardly and downwardly on the inclined track by the lever 15.

As stated before, the size of the box 9 may be made to accommodate one bushel of wheat or a bushel of corn, and when it is desired to use the bushel measure, the open area of the measuring box 9 is filled with grain and the weight thereof pulling against the spring 26 sets the pointer 21 at a resultant point on the scale 23. After this is set, the box 9 may be raised by the lever 15 wherein the grain will flow through the opening 11 into one of the chutes 5 or 6. In this position the downwardly extending flange on the face of the box 9 closes the gate 3. After grain has flowed from the box, the box is again lowered to such a position that it will receive a full supply of grain, at which time it may again be raised so that the grain will flow through the opening 11. Thereby, by manually operating the measuring box 9 upwardly and downwardly consecutive bushels of grain may be dumped into the chutes 5 and 6. The element 10 is used to deflect grain alternately, first, into one chute, and then into another. This gives an operator time to tie a sack while grain is being dumped into the sack on the other side. By watching the pointer 21, the operator will know when the full measure of grain has run into the measuring box 9.

Should only one-half or three-quarters of a bushel of grain be desired, this amount of grain is run into the measuring box 9 and the position of the pointer 21 accordingly noted. Then subsequent amounts may readily be measured and dumped by flowing grain into the box until the pointer reaches the indicated point on the scale.

The size of the measuring box 9 may be made to accommodate a unit of measure so that it may be used for whole or ground grain, seeds, beans, peanuts, potatoes, or it may also be used for small articles such as marbles and shot.

It will be understood that changes may be made in the construction without departing from the spirit of the invention.

Having thus described our invention what we claim as new and desire to secure by Letters Patent, is:

1. A measuring and dispensing device for comminuted material, said device comprising a hopper having a restricted discharge opening at its lower end, an inclined slideway open at its upper side to said discharge opening, an inclined chute beneath said slideway, the underside of said slideway being formed with a restricted opening communicating with said chute, a measuring box slidable in said slideway, operating means for moving said measuring box between a lowermost position and an uppermost position in said slideway, said measuring box being open at its top and bottom and being of such length that in the said lowermost position the upper part of the box is registered with said restricted discharge opening whereby material can flow from the hopper through said discharge opening and fill said box to capacity, said measuring box in its uppermost position registering with said restricted opening in the underside of said slideway whereby the contents of said box can flow into and downwardly through said inclined chute and be dispensed from said chute, said operating means comprising a cable connected at one end to said measuring box, contractile spring means connected to the opposite end of said cable for counterbalancing the weight of the material in said measuring box while partially or fully filled with material, a pointer on said cable, a scale along which said pointer can move whenever said cable is moved in changing the position of said box in said slideway, and handle means operatively connected to said measuring box for moving said measuring box to and between its lowermost and uppermost positions.

2. A measuring and dispensing device for comminuted material, said device comprising a hopper having a restricted discharge opening at its lower end, an inclined slideway open at its upper side to said discharge opening, an inclined chute beneath said slideway, the underside of said slideway being formed with a restricted opening communicating with said chute, a measuring box slidable in said slideway, operating means for moving said measuring box between a lowermost position and an uppermost position in said slideway, said measuring box being open at its top and bottom and being of such length that in the said lowermost position the upper part of the box is registered with said restricted discharge opening whereby material can flow from the hopper through said discharge opening and fill said box to capacity, said measuring box in its uppermost position registering with said restricted opening in the underside of said slideway whereby the contents of said box can flow into and downwardly through said inclined chute and be dispensed from said chute, said operating means comprising a cable connected at one end of said measuring box and a spring having one end connected to said hopper and having the other end connected to the other end of said cable for counterbalancing the weight of the material in said measuring box while partially or fully filled with material, a pointer on said cable, a scale along which said pointer can move whenever said cable is moved in changing the position of said box in said slideway, and handle means operatively connected to said measuring box for moving said measuring box to and between its lowermost and uppermost positions, said scale being proportionately extensible to enable changing the spacing of the divisions thereof uniformly, and means mounting said pointer on said cable enabling moving said pointer along said cable to register said pointer with divisions of said scale while said scale is in an extended condition.

3. A measuring and dispensing device for comminuted material comprising a hopper provided with a discharge opening in the bottom thereof and adapted to be supportedly positioned within a bin and spaced above the bottom thereof, an inclined slideway open at its upper side positioned so that the open upper side is in communication with said discharge opening, a chute positioned below and in communication with said slideway, a measuring box open at its top and bottom slidably mounted in said slideway, a scale, means operatively connected to said measuring box for effecting the sliding movements of the latter, a pointer on said means and movable along said scale, and handle means operatively connected to said measuring box for moving said box to any select position of its sliding movements.

4. A measuring and dispensing device for comminuted material comprising a hopper provided with a discharge opening in the bottom thereof and adapted to be supportedly positioned within a bin and spaced above the bottom thereof, an inclined slideway open at its upper side positioned so that the open upper side is in communication with said discharge opening, a chute positioned below and in communication with said slideway, a measuring box open at its top and bottom slidably mounted in said slideway, a scale, means including a contractile spring means operatively connected to said measuring box for effecting the sliding movements of the latter, a pointer on the portion of said means other than said spring means and movable along said scale, and handle means operatively connected to said measuring box for moving said box to any select position of its sliding movements.

ERVIN D. GEIGER.
FOREST GEIGER.

REFERENCES CITED

The following references are of record in the file of this patent:

UNITED STATES PATENTS

| Number | Name | Date |
|---|---|---|
| 101,411 | Bache | Apr. 5, 1870 |
| 344,395 | Miller | June 29, 1886 |
| 503,571 | Bastin | Aug. 22, 1893 |
| 789,085 | Dary | May 2, 1905 |
| 1,264,732 | Williams | Apr. 30, 1918 |
| 1,491,803 | Johnson | Apr. 29, 1924 |
| 1,980,057 | Horkavis | Nov. 6, 1934 |
| 2,256,116 | Hughes | Sept. 16, 1941 |